Aug. 12, 1930.  J. CRONING  1,772,747
DEVICE FOR PREVENTING THEFT AND UNAUTHORIZED USE OF POWER VEHICLES
Filed June 3, 1925  2 Sheets-Sheet 1

INVENTOR:
Johannes Croning
By Richards & Geier
Attys

Aug. 12, 1930.  J. CRONING  1,772,747
DEVICE FOR PREVENTING THEFT AND UNAUTHORIZED USE OF POWER VEHICLES
Filed June 3, 1925  2 Sheets-Sheet 2
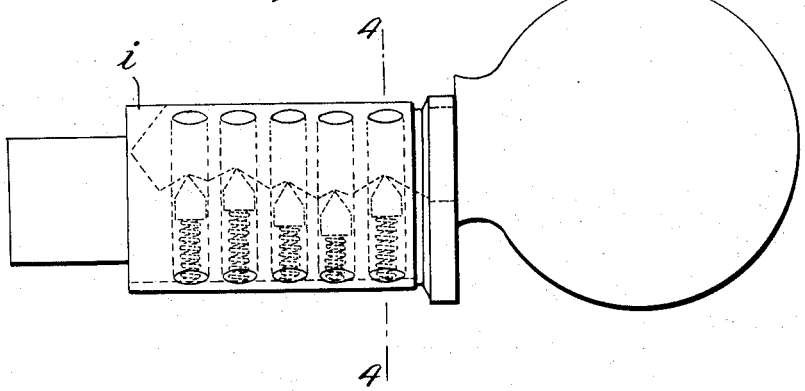
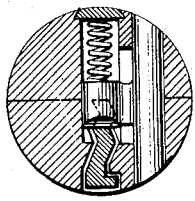
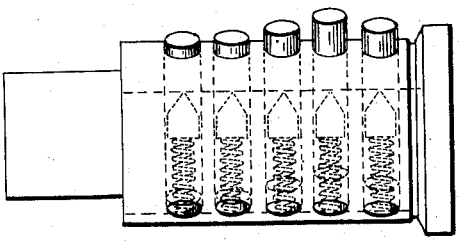
INVENTOR
JOHANNES CRONING
BY
ATTORNEYS Patented Aug. 12, 1930

1,772,747

UNITED STATES PATENT OFFICE

JOHANNES CRONING, OF HAMBURG, GERMANY, ASSIGNOR, BY MESNE ASSIGNMENTS, TO CROWN LOCK COMPANY, A CORPORATION OF DELAWARE

DEVICE FOR PREVENTING THEFT AND UNAUTHORIZED USE OF POWER VEHICLES

Application filed June 3, 1925, Serial No. 34,653, and in Germany October 25, 1924.

This invention has for its object to render the theft and unauthorized use of power vehicles impossible. The devices hitherto used for this purpose are not sufficiently satifactory or too inconvenient, and under certain conditions may become dangerous when operated erroneously. Hitherto either the ignition circuit was broken, this however was not very suitable by reason of the simpleness of the keys which could easily be replaced by other means, or the steering column was locked, but the devices for this purpose were again mostly inconvenient and were not often secure. To use both of these devices again leads to errors as the ignition circuit may be closed, but it is possible to forget to release the steering column so that the occupants of the vehicle may be exposed to considerable danger.

The present invention has for its object to entirely exclude any mishandling. It provides an arrangement wherein the device for breaking the ignition circuit serves at the same time as a safety device controlling the movement of the steering column, so that the operation of these two parts may be interdependently controlled by a single device. Thus, for instance, the arrangement permits the breaking of the ignition circuit and locking of the steering post by the use of the same device, to guard doubly against unauthorized use of the vehicle; and also prevents the careless starting of the vehicle with the steering post locked.

As to the drawings, the recesses on either side of the locking cylinder $i$ are not occupied by pins projecting from that cylinder when the key is inserted, so the cross-hatched portion does not interfere with the removal of that cylinder. In this manner the starting of the motor by an unauthorized person is impossible as the safety device is secured by a lock which can only be opened by a complicated key, which can be varied so that each key will operate successfully on only the one lock for which it is made.

In the accompanying drawing is shown by way of example one form of construction according to the invention.

Figure 1:
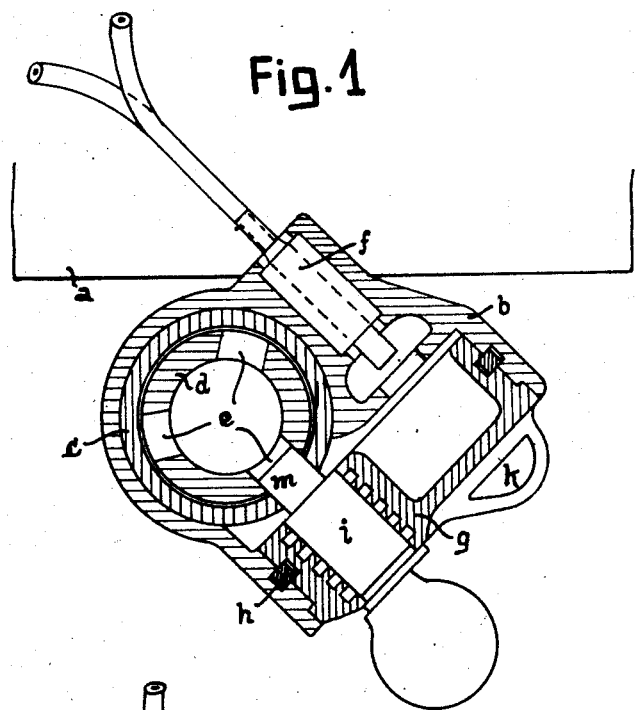
Figure 1 shows a section of the locked steering rod.
Figure 2:
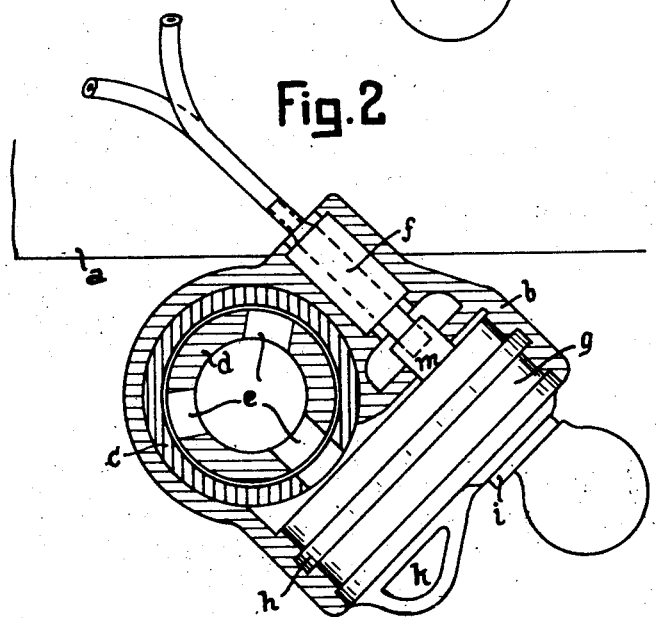
Figure 2 is a section of the unlocked steer-rod.

Figures 3, 4 and 5 show in more detail the preferred form of locking mechanism of the locking cylinder, Figures 3 and 4 showing such mechanism with the key inserted so that the pins are wholly within the cylinder which is thus withdrawable, and Figure 5 showing the mechanism with the key withdrawn so that the pins project and are engageable to prevent the removal of the cylinder. The mechanism thus shown consists of pins movable in alined holes in the cylinder, each pin having an integral portion projecting laterally and extended over the keyway so as to be movable in the one direction by the key, spring pressure operating on the laterally extending portion and tending to move the pin in the other direction. The cylinder carrying such mechanism is used in connection with power vehicles equipped substantially as follows:—

On the dash-board $a$ is provided the casing $b$ for the lock for the steering post, this casing surrounding the steering post $d$ guided in a column $c$, the steering post being provided with openings $e$. The switch $f$ for the ignition circuit is also contained in the lock casing $b$. Towards the side, from which the device is to be used, the casing $b$ is in the form of a hollow cylinder and is closed by a rotary cylinder $g$ which is retained in the casing $b$ by a spring ring $h$. On one side this cylinder is hollow for the reception of the locking cylinder $i$, whilst the other side is closed and only carries for example the handle $k$ for turning the cylinder $g$. The locking cylinder $i$ is provided on its inner end with a pin $m$.

The application of the device is as follows: If the steering post $d$ is to be locked the cylinder $g$ is rotated in such a manner that the hollow cylinder for the reception of the locking cylinder $i$ is in front of the steering post $d$. The locking cylinder $i$ is then inserted and locks, when the key is withdrawn, the steering post $d$ by means of its pin $m$ which engages with one of the holes $e$. Even if the driver were in possession of a second locking cylinder it is not possible for him, as would be likely to occur in a hurry to close the ignition circuit as the switch $f$ is covered. If the vehicle is to be used, the key is inserted into the locking cylinder $i$ and the lock can then be readily withdrawn. If the cylinder is now turned in front of the switch $f$ the locking cylinder $i$ inserted and the key withdrawn, the locking circuit is closed and the steering post is free to be turned. In this position it is then also impossible, after the ignition circuit has been closed, to accidentally lock the steering column $b$.

It will be noted that since the locking cylinder $i$ carries pins pressed by springs beyond its surface when the key is withdrawn but wholly within the circumference of the locking cylinder when the proper key is in the keyway thereof, it can be inserted into or withdrawn from the hollow cylinders provided for its reception only with the assistance of the proper key, and since the same locking cylinder is used both to lock or free the steering wheel and to close or open the ignition circuit, the driver is protected not only against unauthorized use of the vehicle by others, but also against accidents resulting from his own inadvertence.

Having thus described my invention, what I claim is:

1. A device for protection against unauthorized use of power vehicles comprising a casing provided with openings communicating respectively with the steering post and a switch on the ignition circuit, and a removable locking cylinder carrying means to lock the steering post or close the circuit by insertion in the respective openings aforesaid and carrying also pins movable by the proper key wholly within the circumference of the cylinder and spring-pressed to project when the key is withdrawn beyond the circumference of the cylinder to lock the cylinder against withdrawal.

2. A device according to claim 1, wherein the casing comprises means whereby one of the openings is closed when the other is occupied by part of the locking cylinder.

In testimony whereof I have affixed my signature.

JOHANNES CRONING.